United States Patent [19]
Pasbrig

[11] Patent Number: 5,281,785
[45] Date of Patent: Jan. 25, 1994

[54] APPARATUS FOR PREPARING BEVERAGES IN A MICROWAVE OVEN

[75] Inventor: Max H. Pasbrig, Orselina, Switzerland

[73] Assignee: Lacrex S.A., Orselina, Switzerland

[21] Appl. No.: 957,304

[22] Filed: Oct. 6, 1992

[30] Foreign Application Priority Data

Feb. 20, 1992 [CH] Switzerland .......................... 201/92

[51] Int. Cl.⁵ .............................................. H05B 6/82
[52] U.S. Cl. ...................... 219/10.55 E; 219/10.55 R; 99/306; 99/DIG. 14
[58] Field of Search ............... 219/10.55 E, 10.55 R; 99/306, 300, 302 R, 304, DIG. 14; 426/241

[56] References Cited

U.S. PATENT DOCUMENTS

| | | | |
|---|---|---|---|
| 4,381,696 | 5/1983 | Koral | 99/304 |
| 4,908,222 | 3/1990 | Yu | 219/10.55 E |
| 4,990,734 | 2/1991 | Hirsch | 219/10.55 E |
| 4,999,466 | 3/1991 | Waligorski | 219/10.55 E |
| 5,028,753 | 7/1991 | Shariat | 219/10.55 E |
| 5,049,713 | 9/1991 | Creyaufmuller | 219/10.55 E |

*Primary Examiner*—Philip H. Leung
*Attorney, Agent, or Firm*—Millen, White, Zelano, & Branigan

[57] ABSTRACT

A device for preparing hot drinks from a liquid and a drink medium, with a liquid container (1) holding the liquid and a drink medium container (2) holding the drink medium (7), wherein the heated liquid is conveyed through the drink medium container into a drink container (3) holding the hot drink. The liquid container (1) is closed so that it is substantially vapour-tight and has an overflow (10) which is directed into the drink medium container (2). At least the liquid container (1) is made of a material which is permeable to microwaves.

15 Claims, 3 Drawing Sheets

APPARATUS FOR PREPARING BEVERAGES IN A MICROWAVE OVEN

SUMMARY OF THE INVENTION

The invention relates to a device for preparing hot drinks from a liquid and a drink medium, with a liquid container holding the liquid and a drink medium container holding the drink medium, by means of which the heated liquid is conveyed into a drink container holding the hot drink, characterized in that the liquid container is closed so that it is substantially vapor-tight and has an overflow which is directed into the drink medium container and that at least the liquid container comprises a material which is permeable to microwaves.

An microwave beverage maker is known according to U.S. Pat. No. 4,990,886 which comprises a water container a container on the side for receiving a beverage made by passing hot water over an ingredient and a basket for holding a beverage ingredient provided at an upper end of the container. When hot liquid is supplied into basket, a hot liquid and beverage ingredient mixture exits from the basket into the receiver portion. The lower water container and the beverage receiving container are disposed side-by-side an automatic coffee maker is known according to IT Patent No. 47618 which comprises a lower water container with a valve disposed in the container wall, a filter vessel which can be inserted in the container, and a drinks container screwed on to the water container. Satisfactory operation of this machine is only guaranteed if the water filling the water container does not exceed the level of the valve, and if the water container has been firmly screwed on to the drinks container.

Furthermore, automatic coffee makers are known which comprise a filter vessel, a heated baseplate, and a water container which extends above the filter vessel or laterally between the filter vessel and the baseplate. A coffee jug, into which the brewed coffee runs, can be inserted between the filter vessel and the baseplate; the coffee is collected in this jug and is kept hot by means of the heated baseplate.

The water in the water container is heated by means of a gas or electric heater, which is connected firstly to the water container which holds the cold water and secondly to the upper opening of the filter vessel via a valve and a steam line. By this means, smaller amounts of water are heated each time, and are conveyed directly into the filter vessel, in which there is a filter to hold the ground coffee.

Alternatively, tea can be made in a device of this type, in that instead of ground coffee, tea is placed in a specially shaped filter vessel and is brewed by means of the heated water.

The known automatic coffee or tea makers require a significant period of time to prepare the hot drink, since only small amounts of heated water are conveyed each time into the filter housing and from there into the drink container. For this reason it is necessary to heat the base of the drink container which holds the hot drink, and possibly to provide heat insulation so that the coffee or tea in the drink container does not cool down too much before use. However, keeping the coffee or tea hot in the drink container reduces the flavor and taste of the coffee or tea, and thus leads to a reduction in quality of the prepared drink.

The object of this invention is therefore to create a device of the type cited at the outset which facilitates the preparation of a hot drink in the shortest possible time, with the hot drink being of the highest quality, wherein the device can easily be manufactured at a low manufacturing cost.

This object is achieved according to the invention by a device for preparing hot drinks from a liquid and a drink medium, with a liquid container holding the liquid and a drink medium container holding the drink medium, by means of which the heated liquid is conveyed into a drink container holding the hot drink, characterized in that the liquid container is closed so that it is substantially vapor-tight and has an overflow which is directed into the drink medium container and that at least the liquid container comprises a material which is permeable to microwaves. Particular forms of construction of the invention are covered by the Claims;

This invention is based on the utilizing the advantages of a microwave oven, used in the preparation of meals and beverages, for the preparation of hot drinks also, and creating a device for preparing hot drinks of this type which is particularly suitable for use in microwave ovens. The closed form of the device makes it possible to heat the liquid in the liquid container in the shortest possible time, wherein it is ensured by means of an overflow that only a part of the liquid reaches the filter, so that an optimum, controlled brewing process is achieved. Moreover, the closed form of the device ensures that the prepared drink can be kept without loss of quality, and be kept hot by means of the microwave oven.

By making use of a microwave oven for the preparation of hot drinks also, the user saves the additional cost of purchasing an automatic coffee or tea maker, as well as additional electricity costs.

An advantageous further development of the device according to the invention is characterized in that the overflow comprises a body formed in the liquid container, wherein the top face of the body is closed, the bottom face of the body has a liquid inlet and a liquid outlet, and wherein a barrier wall is disposed in the interior space of the body between the liquid inlet and the liquid outlet.

Forming an overflow in the liquid container ensures that only the heated liquid from the liquid container can reach the drink medium container, and the special form of the overflow ensures that heating the liquid in the liquid container results in a continuous flow from the liquid container into the drink medium container.

A further advantageous form of the device according to the invention is characterized in that the drink medium container comprises a filter and an upper housing part which extends at least above the upper filter opening, wherein the filter can be inserted in the upper housing part. The form of the drink medium container facilitates a closed structural shape for the whole device, so that firstly a compact construction is possible, and secondly no or very little heat loss can occur and no or very little loss of flavor can occur during the preparation of the hot drink.

In a further advantageous form of the device according to the invention, the liquid container is disposed together with the drink medium container underneath the drink container, wherein, due to the special form of the drink medium container, a continuous flow of the heated liquid occurs from the liquid container through the drink medium container into the drink container, in which a special liquid outlet is disposed for the preparation of espresso coffee.

In a further advantageous form of the device according to the invention, the upper housing part additionally extends in a direction into the lower filter opening and is attached by means of a positive-locking connection to a lower housing part which forms the wall of the drink container. This additional measure improves the compactness of the complete unit, and ensures that the device is also suitable for smaller microwave ovens with interiors of reduced dimensions. Moreover, the positive locking attachment of the upper and lower housing parts ensures that a fixed connection is provided when the device is transported, thus preventing individual parts of the device from falling out unintentionally.

In a further advantageous form of the device according to the invention, a handle is formed for the transport of the containers, so that both container parts are surrounded by handles, and can easily be removed from the handles individually and taken apart for cleaning individual container parts.

In a further advantageous form of the device according to the invention, the liquid container is closed by a flat lid, wherein a seal is disposed between the latter and the wall of the liquid container. The flat lid ensures that the complete device has a low overall height, and the seal disposed between the lid and the container wall makes it possible for an overpressure to exist in the liquid container as a result of the heating of the liquid in the liquid container by the microwave radiation; this overpressure then forces the liquid to flow through the overflow into the drink medium container.

A further advantageous form of the device according to the invention is characterized in that the upper housing part has a first handle and the lower housing part has a second handle, wherein both handles adjoin each other so that they are flush with each other. This form firstly creates an elegant closed housing and secondly offers the possibility of transporting the drink medium container with the liquid container inside it on the one hand, and the drink container on the other hand, separately from each other. Moreover, according to a further feature of the device according to the invention, provision is made for the lid which closes the liquid container also to be placed on the drink container when the drink medium container and liquid container are removed, in order to keep the drink hot whilst retaining a good flavor.

DETAILED DESCRIPTION OF THE DRAWINGS

The invention is described in more detail below by means of examples of embodiments, which are also shown schematically in the drawings, where:

Figure 1:
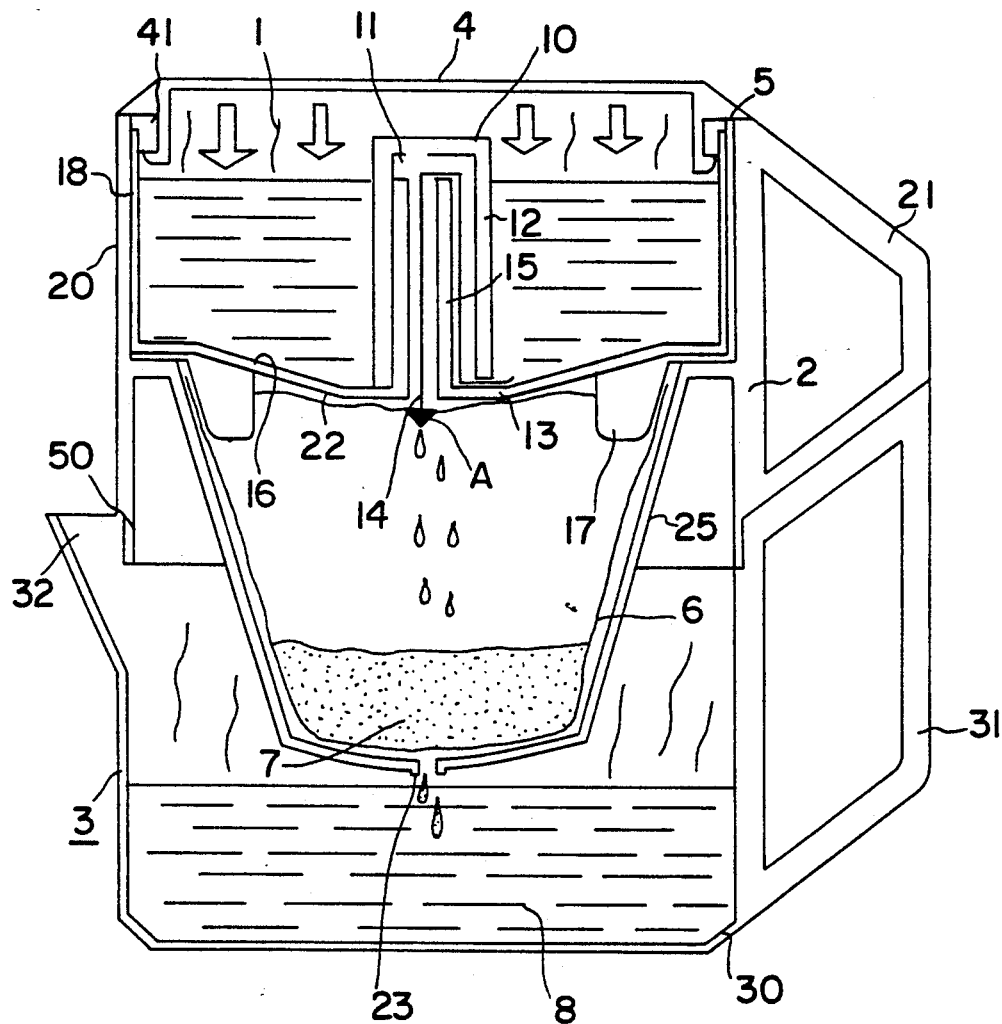
FIG. 1 is a longitudinal section through the device with a schematic representation of the flow path of the heated water or hot drink.

The device shown in FIG. 1 has a jug-shaped drink container 3, in the interior space of which the prepared hot drink, preferably coffee or tea, is collected. The wall 30 of the drink container 3 has a handle 31 on one side and a pouring spout 32 on the other side opposite the handle 31.

A drink medium container 2 can be inserted into the drink container 3, preferably with a positive-locking connection, wherein the attachment between the drink medium container 2 and the drink container 3 is effected in a region of overlap 50. The drink medium container 2 comprises a housing 20 and a filter body 25 disposed inside the housing 20, wherein the filter body in the embodiment illustrated is formed as an inverted frustum of a cone. Obviously the filter body 25 can also have any other cross-sectional shape which is customary commercially.

A filter 6 can be inserted in the filter body 25; this filter preferably comprises a paper which is permeable to liquids, in which the drink medium 7 can be placed.

The housing 20 of the drink medium container 2 is provided with a handle 21, which preferably ends flush with the handle 31 of the drink container 3.

A liquid container 1 can be inserted in the drink medium container 2; this liquid container serves as a receptacle for a liquid, preferably water. An overflow 10 is located in the center of the liquid container 1; on heating, the liquid can flow from the liquid container 1 into the drink medium container 2 via this overflow.

The overflow 10 is preferably arranged centrally in a depression in the bottom face 16 of the liquid container 1, and comprises a closed top face 11 and a substantially closed sidewall which merely has one liquid inlet 13. A bridge piece 15 is disposed inside the substantially closed sidewall 12; this bridge piece forces the heated liquid from the liquid inlet 13 up to the region of the closed top face 11, and from there to the liquid outlet. In the drawing of FIG. 1, the path of the liquid from the liquid container 1 into the drink medium container 2 is shown schematically by the arrow A.

Lugs 17 are provided so that the liquid container 1 is inserted centrally in the drink medium container 2; these lugs extend from the base 16 of the liquid container 1 into the upper opening 22 of the filter body 25.

The liquid container 1 is closed at the top by means of a flat lid 4, which has a circular groove 41 around its periphery in which a seal 5 is inserted; this seal fits closely against firstly the lid 4 and secondly the wall 18 of the liquid container 1 or the wall of the housing 20, so that it seals them.

To prepare a hot drink, coffee for example, ground coffee 7 is placed in a filter 6 inserted in the filter body 25, and then the liquid container 1, which is filled with liquid, preferably water, is inserted in the housing 20 and closed with the lid 4. The complete device is then placed in a microwave oven, and after switching on the microwave oven the liquid in the liquid container 1 is heated. An overpressure is produced due to the heating of the liquid in the closed liquid container 1, and the liquid flows from the liquid container 1 via the overflow 10 into the filter 6 and percolates through the drink medium therein, and the hot drink thus prepared drips through the lower outlet opening 23 of the filter body 25 into the drink container 3, where the prepared hot drink 8 is collected and can be poured out via the pouring spout 32 into drinking vessels for consumption.

The device shown in FIG. 1 is preferably constructed in the shape of a cylinder and has two specially formed handles 21, 31, which according to choice can be used as one handle or for the separate manipulation of the drink medium container 2 and the drink container 3. For this purpose one handle 21 of the drink medium container 2 is formed with a trapezoidal shape, whilst the other handle 31 of the drink container 3 is formed as a type of parallelogram, wherein each of the two narrow sides of the handles 21, 31 adjoin and align with each other.

Figure 2:
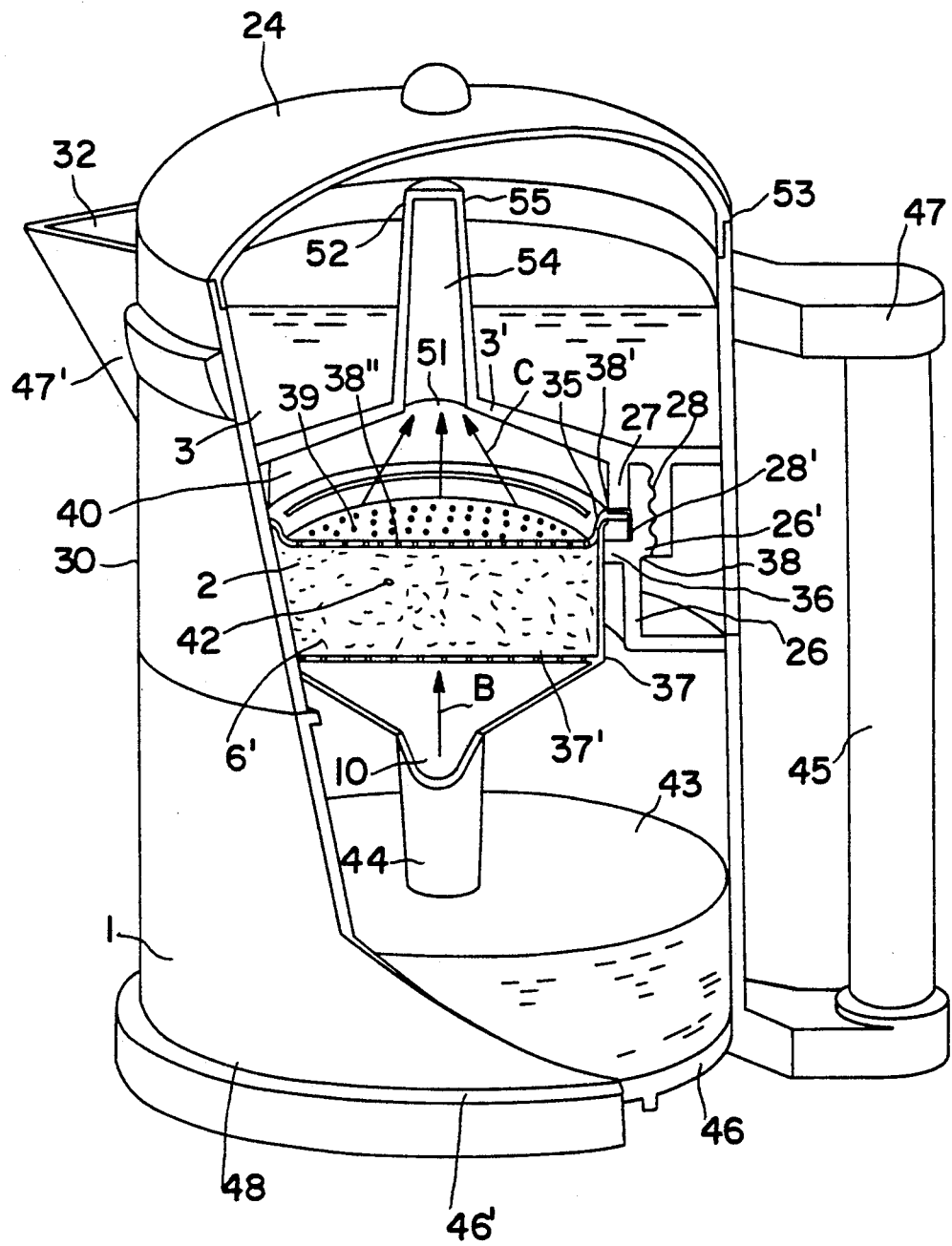
FIG. 2 is a partial section through the device.
Figure 3:
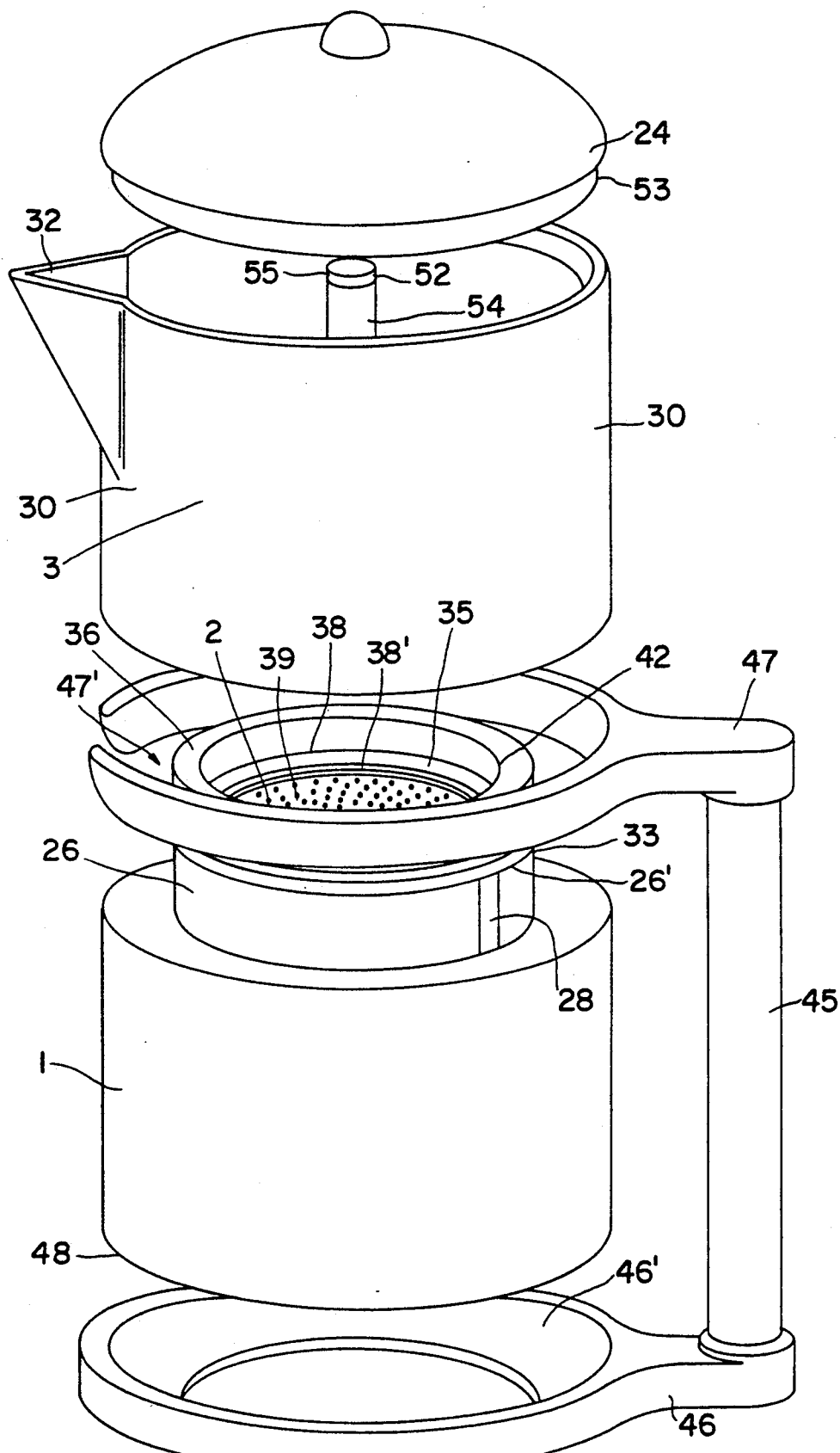
FIG. 3 is a partial plan and side view of individual parts of the device shown in FIG. 2.

The device shown in the drawings of FIGS. 2 and 3 has a liquid container 1, a drink medium container 2, a drink container 3, and a handle 45.

For transporting the container, a specially formed handle 45 has a lower handle part 46 with an indentation 46' in which the base 48 of the liquid container 1 can be inserted. The handle part 47 has an opening 47' in which the drink container 3 is placed and from which it can be removed.

A pouring spout 32 is disposed in a wall 30 of the drink container 3 opposite the handle part 47 for pouring out the hot drink.

A drink medium container 2 is disposed in the liquid container 1; this drink medium container comprises a funnel-shaped housing 42, a tubular part 44, and a round part 43 which is open downwards.

A filter body 37, with sieve-like apertures 37', into which a reduction filter 6' can be inserted, is disposed inside the housing 42. The filter preferably comprises a paper which is permeable to liquids, in which the drink medium can be placed.

In the drawing of FIG. 2 the path taken by the liquid, as a result of its being heated in the closed liquid container 1 and the overpressure that this produces, is shown schematically by the arrows B and C. The liquid flows from the liquid container 1 and the tubular part 44, through the filter 6' with the drink medium container 2 and through the empty space 40, into the drink container 3.

The drink medium container 2 is closed at the top by a disc 38 which is acted upon by the stay 27. This disc has an edge 38' and an indentation 38" and is provided with sieve-like apertures 39 for the passage of the liquid. An empty space 40 is provided above the disc 38 as a flavor chamber.

The liquid container 1 has an upper part 26 with a smaller circumference with a groove 26' running peripherally round it and an inward facing edge 36 to take a sealing ring 33, which is seated closely against the edge 36 on the one hand and the edge 35 of the drink medium container 2 on the other hand, so that it seals them.

Stays 27, 28 are provided to ensure a positive locking connection of the liquid container 1, the drink medium container 2 and the drink container 3. These stays extend from the base 3' of the drink container 3 to the edge 35 of the drink medium container 2 and to the upper part 26 of the liquid container 1, respectively. The lower part of the stay 28 has a cam 28' which engages in the circular groove 26' in the upper part 26 of the liquid container wherein the cam 28' and the groove 26' form a connection. Obviously the positive-locking connection can also be effected by means of other screw-type connections.

A liquid inlet 51 is disposed centrally in a dome in the base face 3' of the drink container 3. The liquid outflow 52 takes place inside the drink container 3 through gaps 55 disposed in the tubular part 54.

The drink container 3 is closed at the top by a lid 24, the edge 53 of which is seated closely against the wall 30 of the drink container 3 to form a positive-locking connection.

The device is preferably made of a heat-resistant plastic material which is permeable to microwaves and which also has good thermal insulation properties. Moreover, the use of plastic for the device shown in the drawings facilitates simple manufacture by pressing the individual parts of the device, and also permits any desired color to be selected for the parts, so that a pleasing overall appearance is obtained.

The invention is not restricted in its implementation to the above-mentioned preferred embodiments. Rather, a number of variants can be considered which also employ the solution illustrated for fundamentally different types of construction. Thus, it is also envisaged that the filter body 37, which is disposed inside the housing 42 of the drink medium container 2 and which can be removed from the latter, and the disc 38 with the sieve-like apertures 39, can be made of aluminium. Thus the design as shown in FIG. 2 can also be employed for the preparation of espresso coffee or of tea from tea bags.

I claim:

1. An apparatus for preparing beverages comprising:
   a liquid container having an open upper end, a sidewall, and bottom;
   a drink medium container having an upper funnel-shaped housing and a tubular member extending downward from said upper housing, said upper housing having a filter body therein and a sieve disc positioned above said filter body wherein said upper housing, filter body and sieve disc defined a region within said upper housing capable of containing a drink medium;
   said drink medium container being insertable into said open upper end of said liquid container;
   a drink container having an open upper end, a side wall, a bottom surface, a tubular liquid inlet positioned in said bottom surface, a spout positioned in said side wall, and a lid to close said upper end of said drink container, said drink container being seatable on said upper housing of said drink medium container;
   said liquid container being in fluid communication with said drink container whereby fluid can flow upward from said liquid container through said tubular member, filter body and sieve disc of said drink medium container and through said tubular liquid inlet into said drink container; and
   said liquid container comprising a material permeable to microwaves.

2. A device according to claim 1, wherein said liquid container, said drink medium container, and said drink container each comprise a material which is permeable to microwave.

3. A device according to claim 1, wherein said bottom surface of said drink container is inclined upwards towards said tubular liquid inlet disposed in the center of said bottom surface, said tubular liquid inlet having liquid outlet means positioned at an upper end thereof.

4. A device according to claim 1, wherein said drink container is attached with a positive fit connection to both said drink medium container and an upper part of said liquid container by means of stays.

5. A device according to claim 4, wherein a sealing ring is disposed between said upper part of said liquid container and said drink medium container.

6. A device according to claim 1, wherein said liquid container and said drink container are cylindrically shaped.

7. A device according to claim 1, further comprising a handle having an open upper handle part and a lower handle part attached to each other by means of a tubular member.

8. A device according to claim 7, wherein the spout of said drink container is positioned opposite said handle.

9. A device according to claim 1, wherein said drink container further comprising means extending downward from said bottom surface to engage said drink medium container, thereby define a region between said upper housing of said drink medium container and said bottom surface of said drink container.

10. An apparatus for preparing beverages comprising:
 a liquid container having a lid, a side wall, and a bottom surface inclined downward toward a liquid overflow positioned in the center of said bottom surface;
 said overflow comprises a body end and a bottom end, said top end being closed and said bottom end having a liquid inlet and a liquid outlet, said overflow further comprising a barrier wall disposed in the interior thereof between said liquid inlet and said liquid outlet, whereby fluid flowing from said liquid inlet to said liquid outlet, whereby fluid flowing from said liquid inlet to said liquid outlet flows over said barrier wall;
 a drink medium container having an open top, a side wall and a bottom wall having a liquid outlet means positioned therein, said drink medium container defining a region capable of container a drink medium; and
 a drink container having an open upper end, a side wall, a bottom surface and spout positioned in said side wall;
 said liquid container being vapor-tight and comprising material permeable to microwaves; and
 said liquid container being in fluid communication with said drink container whereby fluid can flow downward from said overflow of said liquid container through said drink medium container and said outlet mans positioned in the bottom wall of said drink medium container, and into said drink container.

11. A device according to claim 10, wherein said drink medium container further comprises a filter and an upper housing part which extends above said filter, wherein said liquid container is insertable in said upper housing part.

12. A device according to claim 11, wherein said upper housing part also extends in the direction of said liquid outlet means in said bottom wall and is attached by means of a positive-locking connection to said side wall of said drink container.

13. A device according to claim 10, wherein a seal is positioned in a peripheral groove in said lid and is disposed between said lid and said side wall of said liquid container.

14. A device according to claim 10, wherein said bottom surface is provided with insertion lugs, which are insertable into said open top of said drink medium container.

15. An apparatus for preparing beverages comprising:
 a liquid container having a lid, a side wall, and a bottom surface inclined downward toward a liquid overflow positioned in the center of said bottom surface;
 a drink medium container having an open top, a side wall and a bottom wall having a liquid outlet means positioned therein, said drink medium container defining a region capable of containing a drink medium; and
 a drink container having an open upper end, a side wall, a bottom surface and spout positioned in said side wall,
 said liquid container being vapor-tight and comprising material permeable to microwaves;
 said liquid container being in fluid communication with said drink container whereby fluid can flow downward from said overflow of said liquid container through said drink medium container and said outlet means positioned in said bottom wall of said drink medium container, and into said drink container;
 said drink medium container further comprising an upper housing portion in which said liquid container is insertable, said upper housing portion being provided with a first handle having a trapezoidal shape; and
 said drink container further comprising a second handle having a parallelogram shape wherein the bottom surface of said first handle adjoins the upper surface of said second handle at an upward incline so that said first handle and second handle are flush against one another.

* * * * *